Jan. 11, 1949.  A. M. CUMMINGS  2,458,569
DYNAMOELECTRIC MACHINE
Filed Dec. 1, 1944  2 Sheets-Sheet 1

Inventor
Archibald M. Cummings.
By Clarence A. O'Brien
and Harvey B. Jackson
Attorneys Jan. 11, 1949.   A. M. CUMMINGS   2,458,569
DYNAMOELECTRIC MACHINE
Filed Dec. 1, 1944   2 Sheets-Sheet 2

Inventor
Archibald M. Cummings,
By
Attorneys

Patented Jan. 11, 1949

2,458,569

UNITED STATES PATENT OFFICE 2,458,569

DYNAMOELECTRIC MACHINE

Archibald M. Cummings, Port Angeles, Wash.

Application December 1, 1944, Serial No. 566,205

2 Claims. (Cl. 171—252)

This invention relates to electric generators and motors and it has for its object to provide a new type of electric alternator working on the base of a principle which may also be applied to motors especially to D. C. motors.

According to the invention, the stator of an electric machine is provided with two types of winding. One winding is a stator winding proper on which in alternators the current is induced, while the other closed winding is a field winding which has no fixed end connections, but which may be connected at any point of the circumference of the annular part of the stator with the source of current.

This connection is performed by means of the rotor which is provided with brushes sliding on the field winding and supplied with the exciting current, which is fed to the brushes.

The energizing of the field winding magnetizes the stator ring but the magnet poles will rotate on the stator with the rotor which permanently shifts its connection with the field winding.

The effect is similar to that obtained by a rotating field, but with the modification that the rotor is of a much more simple character. In fact, the rotor consists merely of a brush carrier, a brush and a current carrier supplemented by the means such as a contact ring, to feed current to it. The stator windings will, therefore, carry an A. C. during the rotation of the rotor when field current is supplied to the latter.

As the magnetic flux changes permanently at every point of the stator ring, this will entail a permanent variation of the self induction in the field winding. However, as the self induction in every point alternately increases and decreases, or, if the entire stator is considered, as to every increase in one point a decrease in another point corresponds these changes will compensate or balance each other and the poles retain the same strength and exercise the same influence as if the windings would rotate with them.

The invention is illustrated in the accompanying drawings showing two modifications of the invention. It is, however, to be understood that these modifications are shown by way of example and are illustrative of the principle on which the invention is based. They do not indicate the sole embodiments of the invention which are possible and are not limitative. Based on the embodiments of the invention described, the expert skilled in the art will readily be able to construct other embodiments without in any way departing from the spirit or essence of the invention.

In the accompanying drawings

Figure 1:
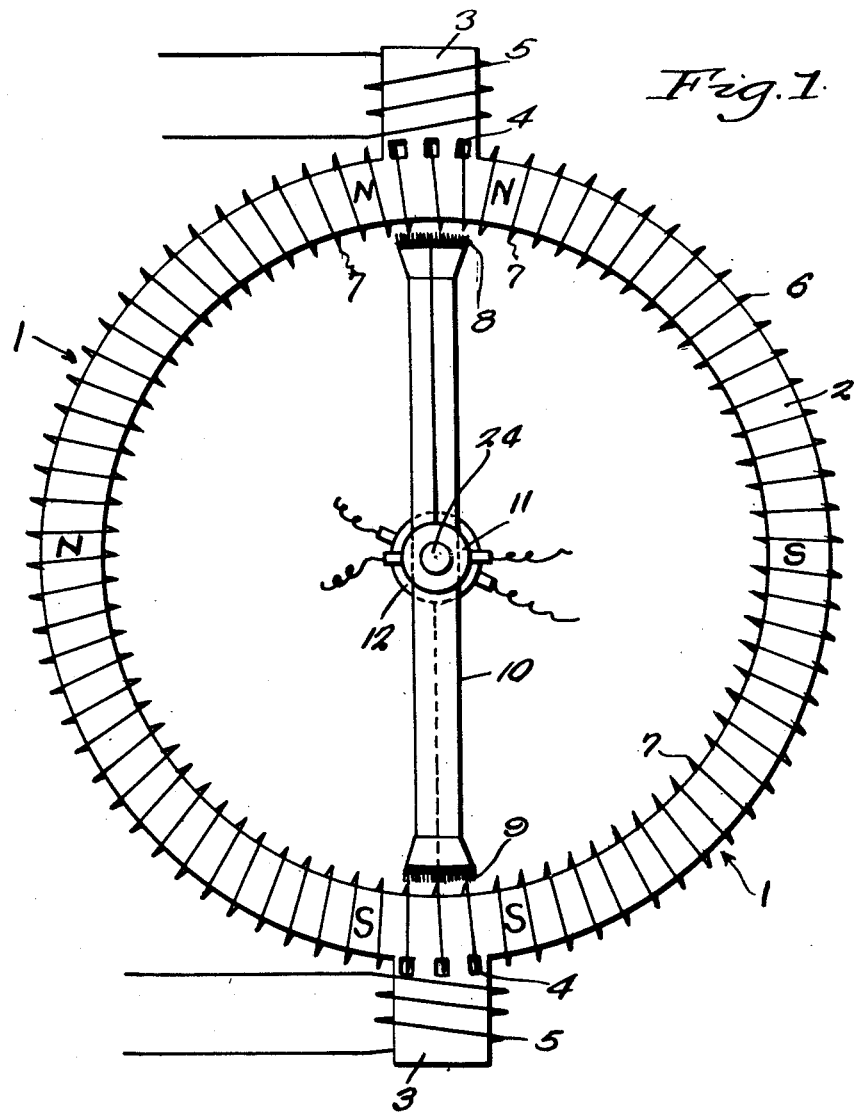
Figure 1 is a diagrammatic view of one modification of the invention, when applied to alternators.

The modification illustrated diagrammatically in Figure 1 is a two-pole single phase alternator arranged according to the above explained principles. The stator is generally indicated by the reference letter I. As shown, it consists of the closed annular or ring section 2 and of the two outwardly projecting radial sections 3. Channels or slots 4 are provided where these two sections join in order to permit the passage of the field windings. Said stator I carries two different windings 5 and 6, the former windings, which are carried by the radial sections forming the stator windings proper, while the latter winding 6 is a continuous winding running around the annular part 2 of the stator. The inner ends 7 of the winding 6 facing the center are without insulation or are connected with metallic conductors and over these metallic parts of the winding 6 brushes 8, 9 fastened to the rotor 10 are sweeping. The rotor consists of or carries a conductor capable of carrying current to the brushes 8, 9, said current being fed to the brushes by means of the slip rings 11, 12 cooperating with the slip contacts 13, 14.

When the rotor 10 is rotated and current is supplied to the slip rings 11 and 12 a magnetic field is formed in the stator by the current flowing through the field winding. In the position of the rotor as shown, poles such as indicated at N and S will be formed in the stationary member 2.

The formation of poles in the annular stator at the points indicated in Figure 1 is due to the connections of the field winding made with the rotor 10. The current enters, for example, at slip ring 11 and flows through the conducting members of the rotor to brush 8. This brush is in contact with the field winding 6 which, being a continuous closed winding, forms a current path consisting of two parallel branches, which again join at the point, at which brush 9 is applied to the field winding.

As the directions of current flow in the two halves or branches of the winding 6 are opposed to each other the magnetic flux in the two halves of the annular stator 2 is clockwise in the right section of the stator in Figure 1 and anticlockwise in the left section.

When the rotor has turned through 180° the current which enters through slip ring 11 and brush 8 flows through the sections of the winding of the stator in a completely reversed direction. The magnetic flux produced in the right half of the stator (Figure 1) is therefore now anti-clockwise while the direction of the magnetic flux in the left half of the stator is clockwise.

In an intermediate stage for instance in a position of the rotor perpendicular to the position shown, current entering through 8 flows through two parallel branches or sections which are arranged one above the other in Figure 1, and the magnetic flux will be directed clockwise in the lower section and anti-clockwise in the upper section. The points which are located below the two radial extensions 3 are now neutral points located between the two poles and therefore the field strength at this point is nil.

The magnetic flux through the radial projections 3 is identical with the magnetic flux entering at the base of the said projection where the latter joins the annular position 2. As the magnetic field produced in this point varies during the rotation of the rotor as explained and oscillates between a maximum in one direction, a zero field and a maximum in the other direction when the rotor turns through 180° it will be clear that the current produced by induction in winding 5 will vary exactly to the same extent. An alternating current of sine form is thus produced in the winding 5.

The effect produced will therefore be the same, as if a rotating field would act on stationary windings. An alternating single phase current is, therefore, generated in said windings 5, in the modification shown in which the brushes 8 and 9 are set to contact the winding at diametrically opposite poles.

Figure 2:
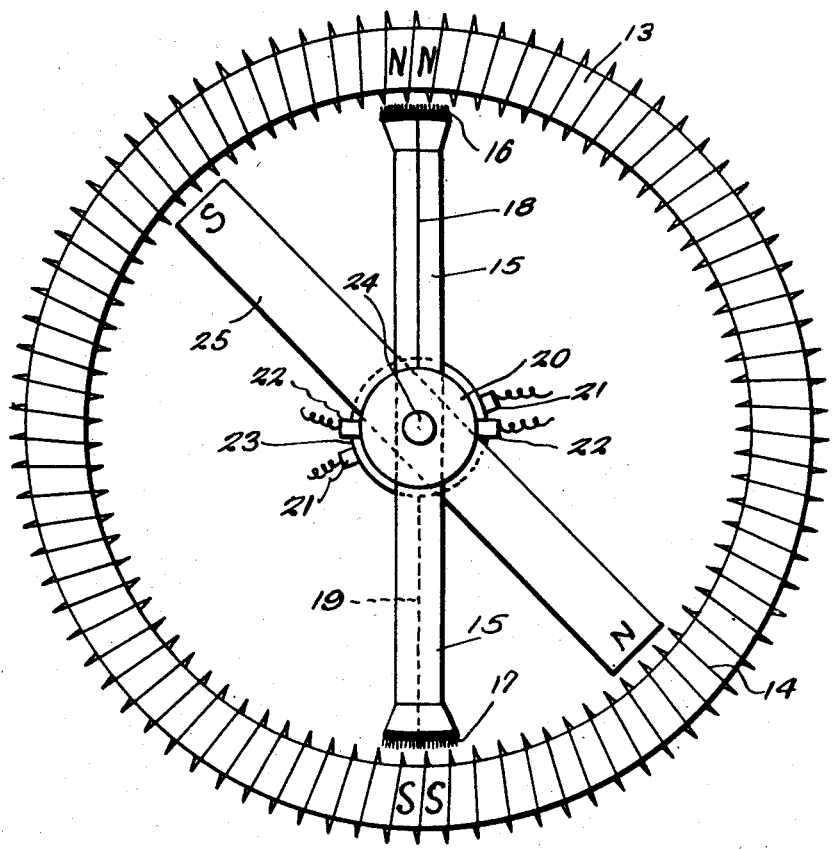
Figure 2 is a diagrammatic view of another modification of the invention, when applied to a D. C. motor.

A modification showing a D. C. motor is shown in Figure 2. The stator consists merely of a ring 13 which is provided with an evenly spaced winding 14 with metallic current carrying surfaces at its inside. The rotor in this case consists of the members 15, carrying brushes 16, 17, sweeping over the current carrying surfaces of the winding 14. They are connected by means of conductors 18, 19 (diagrammatically indicated by lines) with slip rings 20, 21 supplied with currents by slip contacts 22, 23.

On the shaft 24 carrying the member 15 a permanent magnet 25 is mounted at a predetermined angle whose poles extend into the vicinity of the stator ring.

When current is supplied to the slip rings 20, 21 the brushes 16, 17 and the winding 14 the stator may be regarded as an electro-magnet whose poles will always be located at a point which is in fixed relation to the position of the current supplying brushes. The permanent magnet which is suitably arranged will be attracted by the electro-magnet and moves towards its pole (or is repulsed from its pole according to the arrangement selected) and as the brush carrying member moves with it and causes a rotation of the magnet poles, the rotor is submitted to a rotational force.

It is seen that in this way a D. C. motor may be obtained whose mechanical construction is almost as simple as that of an induction motor, a result which could not be achieved with known D. C. motors.

It will be understood that changes made as regards the number of poles, the number of magnets, or the number of stator windings, or subdivisions do not in any way change the principles involved on the operation as described.

What I claim is:

1. A dynamo electric machine of the character specified, comprising a rotating shaft, a rotor mounted thereon, contact brushes mounted on said rotor, a closed annular stator of ferro magnetic material provided with radial projections, windings arranged on said stator, one of said windings being an annular continuous closed field winding encircling the stator and adapted for sliding connection along the entire circumference of the stator, with the aforesaid contact brushes, a further winding arranged on said radial projections of the stator, and means associated with the rotor to supply said field winding with current.

2. A dynamo electric machine comprising a rotating shaft, a rotating member mounted thereon, contact brushes mounted on said rotating member, slip rings on said rotating member and fixed contacts cooperating therewith for supplying said contact brushes with current, a closed annular stator, provided with two outwardly projecting radial projections in diametrically opposed positions, said projections being provided with spaced passages, a continuous closed field winding encircling the stator, with those turns arranged near the radial projections passing through the spaced passages of the said projections, said closed field winding being adapted for a sliding contact of its turns with the aforesaid brushes along a circumferential line, a further winding on each of said projections and means for supplying the slip ring contacts with current.

ARCHIBALD M. CUMMINGS.

REFERENCES CITED

The following references are of record in the file of this patent:

UNITED STATES PATENTS

| Number | Name | Date |
|---|---|---|
| 1,638,614 | Brewster | Aug. 9, 1927 |
| 2,117,991 | Palmer | May 17, 1938 |
| 2,248,616 | Faus | July 8, 1941 |

OTHER REFERENCES

Langsdorf, "Principles of D. C. Machines,"— Fifth Edition McGraw-Hill, 1940.

Kloeffler, Brenneman, Kerchner, "D. C. Machinery," Macmillan, 1934.